3,389,496
PLASTIC AXLE BEARINGS FOR USE ON TOY VEHICLES

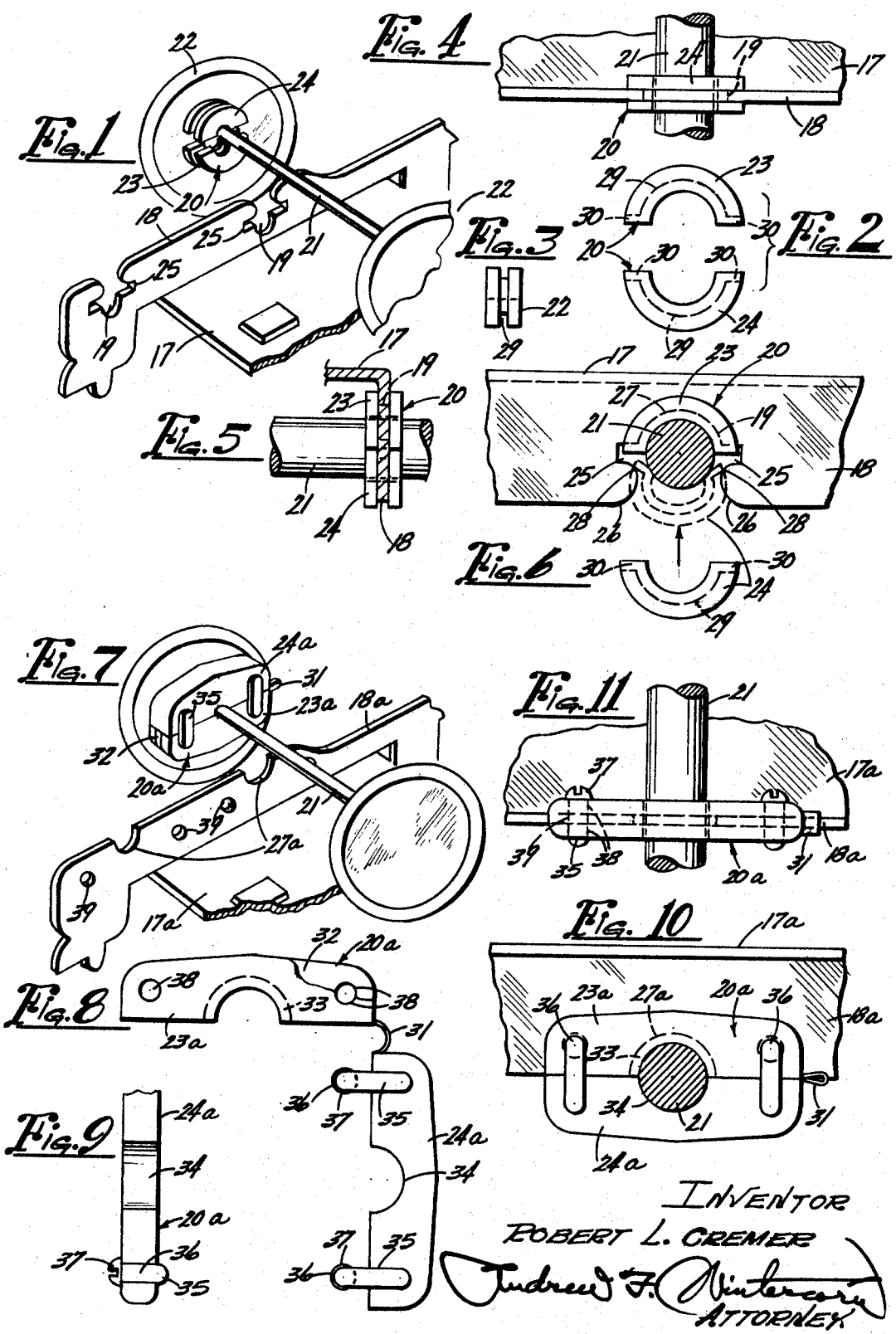

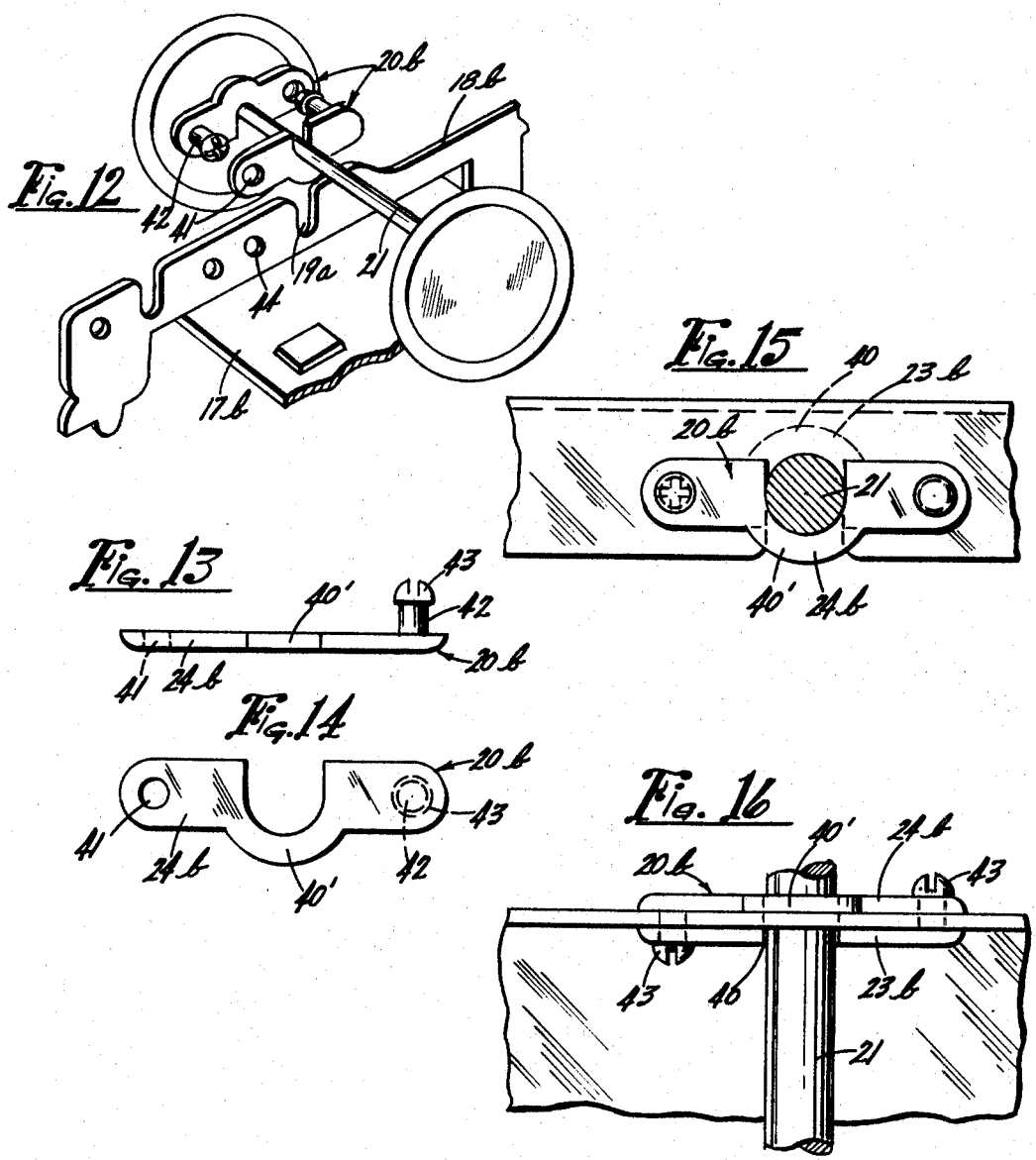

Robert L. Cremer, Freeport, Ill., assignor to King-Seeley Thermos Co., Ann Arbor, Mich., a corporation of Michigan
Filed Dec. 28, 1965, Ser. No. 516,960
8 Claims. (Cl. 46—221)

This invention relates to plastic axle bearings for use on toys, the principal advantages derived therefrom being, first of all, greater economy and greater durability, and secondly, saving in cost of assembling from the standpoint that these bearings make possible and practical the preliminary assembling of wheels on the axles, before the axles and bearings are assembled in the slots provided therefor in the chassis.

In accordance with my invention, the bearings are made in two halves, one half engaging the upper half of the axle and the other half the lower half of the axle, thereby completely enclosing the axle by bearing surfaces without necessitating sacrificing the advantage of having the preliminary assembling of wheels on the axles, the two bearing halves being assembled on the chassis in any one of three ways:

(1) One way is to have the upper half, which is semi-circular in form, and has a semi-circular groove to receive an arcuate portion of the notch in the flange on the chassis, inserted first and after the axle is in place therein, the other half of the bearing is flexed endwise enough to get the same partway in and is snapped into place behind shoulders provided in the entrance to the notch;

(2) Another way is to have the upper bearing half split longitudinally on both sides of the upper half bearing portion that fits in a notch in the flange on the chassis so that the flange fits between the two portions of this bearing half, and then the lower bearing half, which is formed to accommodate the lower half of the axle and provide a bearing therefor, is fastened to the first mentioned bearing half, suitably by means of integral studs on and projecting from the lower half upwardly and laterally so that the laterally extending portions may be forced through registering holes in the upper half and holes provided in the flange of the chassis, and (3) A third way is to have an upper elongated bearing half notched at the middle to fit over the axle from above on one side of the flange of the chassis where the axle extends through a notch in said flange, and the other bearing half of elongated from correspondingly notched and engaging the lower half of the axle on the other side of the flange, the two halves being of similar form, each having a stud at one end and a hole at the opposite end, so that after the two bearing halves have been assembled on the axle from above and below on opposite sides of the flange, they can be fastened together through the flange by forcing the studs through holes provided in the flange and into registering holes provided in the companion bearing halves at the opposite ends of the bearing, one stud extending in one direction and the other stud in the opposite direction.

The invention is illustrated in the accompanying drawings, in which—

FIG. 1 is a perspective view showing a portion of a toy vehicle chassis looking at the bottom thereof and illustrating how an axle with two-piece plastic bearings made in accordance with my invention and engaging the same from above and below is designed to be mounted in the chassis in the notches provided in the opposed flanges of the chassis, both ends of the axle being, of course, mounted in the same way on opposite sides of the chassis;

FIG. 2 is a side view of the two plastic bearing halves;

FIG. 3 is an end view of one of said bearing halves;

FIGS. 4 and 5 are, respectively, a bottom plan view and an end view of the bearing as it appears when installed;

FIG. 6 is a side view of FIG. 5 showing the bearing partly assembled and indicating in dotted lines the final step in the assembling operation;

FIG. 7 is a view similar to FIG. 1 showing another two-piece bearing construction like that illustrated in FIG. 8;

FIG. 8 is a side view of the last-named bearing shown in open condition with the two-pieces flexibly connected by a thin integral web;

FIG. 9 is a view at right angles to FIG. 8 of the lower half of the two-piece bearing;

FIGS. 10 and 11 are, respectively, a side view of the bearing installed and a bottom plan view;

FIG. 12 is a view similar to FIGS. 1 and 7 showing another two-piece bearing, one half of which is seen in FIGS. 13 and 14;

FIGS. 13 and 14 are, respectively, a top plan view and a side view of one half of the bearing seen in FIG. 12, and FIGS. 15 and 16 are, respectively, a side view of the bearing completely assembled and a bottom plan view.

Similar reference numerals are applied to corresponding parts throughout the views.

Referring first to FIGS. 1 to 6, the reference numeral 17 designates the sheet metal chassis of the toy vehicle having longitudinally extending flanges 18 in spaced parallel relation along its opposite sides, in which generally U-shaped slots 19 are provided to accommodate the novel two-piece plastic bearings of my invention, indicated generally by the reference numeral 20, to mount the axles 21 on the chassis with the wheels 22 assembled on both ends of the axles. An appreciable saving in cost of production is thereby realized, and, at the same time, a far better grade product is also made possible, as distinguished from prior constructions where the axles had to be assembled in the bearings on the chassis first before the wheels could be applied to the opposite ends, or at least one end. The plastic bearings 20 are not only cheaper than what were used previously but are far better and they actually upgrade the final toy vehicle considerably by virtue of the sound deadening action they give, as distinguished from the tinny or metallic sounds given by other toys when the wheels thereof are banged onto the floor.

The bearings 20 are of two-piece construction, as indicated at 23 and 24 in FIG. 2, and are preferably molded of flexible resilient polyethylene, although certain rubbers of any other similar resilient flexible plastic material could be used, it being important that the bearings be expansible and compressible radially, that being necessary to enable flexing one bearing piece of each bearing endwise, as indicated in dotted lines at 24 in FIG. 6, to enable starting the opposite ends in the slots 19, so that the lower bearing half 24 can then be pressed inwardly to snap into place in the notches 25 to complete the assembling operation after the other bearing half 23 has been inserted as seen in FIG. 6 with the axle 21 engaged therein. The flared rounding of the entrance 26 of the slot 19 is of advantage in snapping the upper half 23 of the bearing into place in abutment with the semi-circular inner end 27 of the slot, and the rounding at 28 of the outer side of the notches 25 facilitates starting the ends of the lower half 24 of the bearing into place in the notches so that the lower half can snap into place. Both halves 23 and 24 are grooved annularly, as indicated at 29, leaving the end portions 30 on the two halves to bear against the upper and lower sides of the notches 25 to hold the bearing halves in place in the slot 19.

In operation, the axles 21 come to the assembly line with the wheels 22 assembled thereon, and, in mounting the same on the chassis, the operator first snaps the upper halves 23 for the two bearings 20 in place in the inner ends of the slots 19 and then places the axle 21 in these halves, after which there remains only the matter of flexing the lower bearing half 24 of each bearing enough to enter the ends 30 in the entrance portion of the slot 19 and then press them inwardly to snap into place in the notches 25. Once the bearings have been installed as described, they are quite secure so that a child is not at all apt to succeed in dislodging any parts of the bearings, and they become a really permanent part of the assembly for the life of the toy. The sound deadening effect obtained with these plastic bearings is highly desirable and a welcome change from the tinny or metallic sounds previously given by even the more expensive toys.

The bearings 20a illustrated in FIGS. 7 to 11 are comparable to the bearings 20 of FIGS. 1 to 6 in that they also are of two-piece construction, each comprising an upper half 23a and a lower half 24a, the two halves being preferably, however, joined together by an integral thin flexible web 31, merely to facilitate assembling and avoid confusion such as might occur if the two pieces 23a and 24a were separate and had to be picked up separately. The upper piece 23a is split longitudinally, as indicated at 32 in FIGS. 7 and 8, to accommodate the flange 18a between the two walls thereof when the semi-circular bearing 33 is engaged in the semi-circular notch 27a in the lower edge of the flange 18a on chassis 17a. Axle 21 fits in the semi-circular bearing portion 33 throughout its upper half, the lower half being engaged in the registering semi-circular notch 34 provided in the lower half 24a of the bearing. The lower half 24a of the bearing 28 is of the same thickness as the upper bearing half 23a and has abutment with the lower edge of the flange 18a, as seen in FIG. 10. To fasten the two halves of the bearing 20a together I provide studs 35 integral with the lower half 24a and extending upwardly alongside the upper half 23a and then at right angles, as indicated at 36, and provided with a diametrically slotted head 37 on the free end, these studs being adapted to be forced through registering holes 38 in the two walls of the upper bearing half 23a and through registering holes 39 provided in the flanges 18a. Hence, the assembling operation with this bearing is substantially as simple as with the bearing 20 first described, as it is a simple matter to slip the upper bearing half 23a into place with its bearing portion 33 engaged in the notch 27a, and then, after the axle 21 has been placed in the bearing portions 33 on both sides of the chassis, the lower bearing halves 25a can be fastened in place quickly by forcing the horizontally extending portions 36 of the studs 35 through the holes 38 in the upper bearing half 23a and through the registering holes 39 in the flange 18a, the heads 37 being easily compressible radially enough to permit forcing the same through the registering holes, and, once these heads get through the holes, they expand immediately and make the fastening very secure, so that a child is not at all apt to succeed in disassembling the bearings, as they become a really permanent part of the toy assembly for the life of the toy.

Referring now to FIGS. 12 to 16, the bearing indicated generally by the reference numeral 20b is also of two-piece construction, the two pieces 23b and 24b being alike except for a reverse arrangement of the middle arcuate bearing portion 40, which extends upwardly on the upper half 23b and downwardly on the lower half 24b, as indicated at 45 in FIGS. 14 and 15. Each of these halves has a hole 41 in one end and a stud 42 integral with the other end and provided with a diametrically slotted head 43. In assembling this bearing in the generally U-shaped slot 19a in the flange 18b of chassis 17b the two pieces 23b and 24b are placed on opposite sides of the axle 21, as seen in FIG. 12, and then one of the studs 42 is forced through a hole 44 in the flange 18b on one side of the slot 19a and through a registering hole 41 in the other bearing half, and this same operation is repeated at the other end of the bearing 20b, the head 43 in each case being compressed radially enough to permit forcing the same through the hole 44 in the flange and through the registering hole 41 in the other bearing half, and, once the head gets all the way through, it expands immediately and makes the fastening quite secure, so that a child is not at all apt to succeed in disassembling the bearing and it becomes a really permanent part of the assembly for the life of the toy.

It is believed the foregoing description conveys a good understanding of the objects and advantages of my invention. The appended claims have been drawn to cover all legitimate modifications and adaptations.

I claim:

1. An axle bearing construction for toy vehicles comprising, in combination, a bearing support having a bearing recess provided therein in which an axle may be disposed in transverse relationship to said support, a circular bearing of flexible resilient non-metallic bearing material made in two halves to permit assembling thereof on opposite sides of said axle with each half giving substantially semi-circular bearing engagement on said axle, means for holding the two halves together and against axial and transverse displacement from said bearing recess after assembly therein with the axle disposed between the two halves.

2. An axle bearing construction as set forth in claim 1 wherein the two bearing halves are externally of semi-circular form and interchangeable and wherein said means includes each said half having an annular groove provided therein externally thereof leaving diametrically opposed radial shoulders at opposite ends of the groove, one side of the bearing recess having a substantially semi-circular portion of said support engageable in the groove in one half of said bearing, the bearing recess having diametrically opposed notches on opposite sides of the entrance thereto, said bearing support having portions on opposite sides of the entrance engageable in opposite ends of the groove in the other bearing half, said other bearing half being adapted to be compressed endwise enough to start entering the radially projecting shoulders at opposite ends of the groove into the notches after which said bearing half is adapted to be pressed inwardly and snapped into place in assembled relation to the first mentioned bearing half holding the latter in place while the engagement of the bearing support in the grooves in both bearing halves prevents axial displacement of said bearing halves from said bearing recess.

3. An axle bearing construction as set forth in claim 1 wherein the bearing is externally of generally rectangular form split lengthwise diametrically relative to the axle in a plane parallel to one edge of said bearing support, the one bearing half being solid and said means for preventing transverse displacement including spaced parallel longitudinal walls on the other bearing half for engagement with opposite sides of the bearing support and having a semi-circular bearing portion joining the walls and adapted to engage in the bearing recess in said bearing support, the means for securing the two halves of the bearing together and in said recess, comprising studs projecting from the solid bearing half alongside the other bearing half, the studs having right angle end portions adapted to be extended into registering holes in the walls of the hollow bearing half and registering holes provided in the bearing support.

4. An axle bearing construction as set forth in claim 1 wherein the bearing is externally of generally rectangular form split lengthwise diametrically relative to the axle in a plane parallel to one edge of said bearing support, the one bearing half being solid and said means for preventing transverse displacement including spaced parallel longitudinal walls on the other bearing half for engagement with opposite sides of the bearing support and having a semi-circular bearing portion joining the walls and adapted to engage in the bearing recess in said bearing support, the means for securing the two halves of the bearing together and in said recess comprising studs projecting from the solid bearing half alongside the other bearing half, the studs having right angle end portions adapted to be extended into registering holes in the walls of the hollow bearing half and registering holes provided in the bearing support, the studs being of compressible resilient material and having compressible resilient heads on the outer ends of the right angle end portions which when compressed to be forced through the registering holes expand upon emerging from said holes to lock the studs in place against displacement from said holes.

5. An axle bearing construction as set forth in claim 3 including a connecting web of flexible material integral with and extending between and joining adjacent ends of the two bearing halves.

6. An axle bearing construction as set forth in claim 1 wherein the two bearing halves each comprises an elongated body portion having a generally U-shaped notch provided in the middle thereof to define a substantially semi-circular bearing portion for engagement with one side of the axle on one side of the bearing support when the axle is disposed in the bearing recess, the other bearing half being of similar form with its bearing portion engaging the axle from the diametrically opposite side and disposed on the other side of said bearing support, the means for securing the bearing halves together and against displacement relative to said recess comprising studs on opposite ends of said bearing halves, each stud extending through a hole in the support and a registering hole in the bearing half on the other side of said support to secure the bearing halves together and against axial displacement with respect to the recess in the bearing support.

7. An axle bearing construction as set forth in claim 1 wherein the two bearing halves each comprises an elongated body portion having a generally U-shaped notch provided in the middle thereof to define a substantially semi-circular bearing portion for engagement with one side of the axle on one side of the bearing support when the axle is disposed in the bearing recess, the other bearing half being of similar form with its bearing portion engaging the axle from the diametrically opposite side and disposed on the other side of said bearing support, the means for securing the bearing halves together and against displacement relative to said recess comprising studs on opposite ends of said bearing halves, each stud extending through a hole in the support and a registering hole in the bearing half on the other side of said support, to secure the bearing halves together and against axial displacement with respect to the recess in the bearing support, each bearing half having one of the studs on one end thereof and a hole provided in the other end to receive the bearing stud on the other half.

8. An axle bearing construction as set forth in claim 1 wherein the two bearing halves each comprises an elongated body portion having a generally U-shaped notch provided in the middle thereof to define a substantially semi-circular bearing portion for engagement with one side of the axle on one side of the bearing support when the axle is disposed in the bearing recess, the other bearing half being of similar form with its bearing portion engaging the axle from the diametrically opposite side and disposed on the other side of said bearing support, the means for securing the bearing halves together and against displacement relative to said recess comprising studs on opposite ends of said bearing halves, each stud extending through a hole in the support and a registering hole in the bearing half on the other side of said support to secure the bearing halves together and against axial displacement with respect to the recess in the bearing support, the studs being each provided with an enlarged compressible head on the outer end thereof adapted to be forced through the registering holes in the support and bearing half and to expand upon emerging to secure the bearing halves together.

References Cited

UNITED STATES PATENTS

| | | | |
|---|---|---|---|
| 3,083,500 | 4/1963 | Balthazor | 46—221 |
| 3,307,291 | 3/1967 | Cremer | 46—222 |

LOUIS G. MANCENE, *Primary Examiner.*

C. R. WENTZEL, *Assistant Examiner.*